(12) United States Patent
Hu et al.

(10) Patent No.: US 12,130,546 B2
(45) Date of Patent: Oct. 29, 2024

(54) OPTICAL ELEMENT DRIVING MECHANISM

(71) Applicant: TDK TAIWAN CORP., Taoyuan (TW)

(72) Inventors: Wei-Chieh Hu, Taoyuan (TW); Yu-Hsien Wan, Taoyuan (TW); I-Hung Chen, Taoyuan (TW); Tun-Ping Hsueh, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 622 days.

(21) Appl. No.: 17/389,938

(22) Filed: Jul. 30, 2021

(65) Prior Publication Data

US 2022/0035118 A1  Feb. 3, 2022

Related U.S. Application Data

(60) Provisional application No. 63/084,312, filed on Sep. 28, 2020, provisional application No. 63/058,932, filed on Jul. 30, 2020.

(51) Int. Cl.
*G03B 30/00* (2021.01)
*G02B 7/02* (2021.01)
*G03B 3/10* (2021.01)
*G03B 5/02* (2021.01)

(52) U.S. Cl.
CPC ............ *G03B 30/00* (2021.01); *G02B 7/023* (2013.01); *G02B 7/025* (2013.01); *G03B 3/10* (2013.01); *G03B 5/02* (2013.01); *G03B 2205/0069* (2013.01)

(58) Field of Classification Search
CPC .. G03B 30/00; G03B 3/10; G03B 2205/0069; G02B 7/023; G02B 7/025
See application file for complete search history.

(56) References Cited

U.S. PATENT DOCUMENTS

| 2008/0259467 A1* | 10/2008 | Chung | G02B 7/08 359/814 |
| 2017/0242214 A1* | 8/2017 | Chuang | G02B 7/09 |
| 2019/0369464 A1* | 12/2019 | Kao | H02K 41/0356 |

FOREIGN PATENT DOCUMENTS

| CN | 219068290 U * | 5/2023 | |
| WO | WO-2014207298 A1 * | 12/2014 | G02B 27/642 |
| WO | WO-2021208724 A1 * | 10/2021 | |

* cited by examiner

*Primary Examiner* — Christopher E Mahoney
(74) *Attorney, Agent, or Firm* — MUNCY GEISSLER OLDS & LOWE P.C.

(57) ABSTRACT

An optical element driving mechanism is provided and includes a fixed assembly, a movable assembly and a connecting assembly. The movable assembly is configured to connect an optical element having an optical axis, and the movable assembly is movable relative to the fixed assembly. The movable assembly is movably connected to the fixed assembly through the connecting assembly.

14 Claims, 14 Drawing Sheets

OPTICAL ELEMENT DRIVING MECHANISM

CROSS REFERENCE TO RELATED APPLICATIONS

This application claims the benefit of U.S. Provisional Application No. 63/058,932, filed Jul. 30, 2020, and U.S. Provisional Application No. 63/084,312, filed Sep. 28, 2020, the entirety of which are incorporated by reference herein.

BACKGROUND OF THE DISCLOSURE

Field of the Disclosure

The present disclosure relates to an optical element driving mechanism, and in particular it relates to an optical element driving mechanism that reduces internal components to achieve miniaturization.

Description of the Related Art

As technology has developed, many of today's electronic devices (such as smartphones) have a camera or video functionality. Using the camera modules disposed on electronic devices, users can operate their electronic devices to capture photographs and record videos.

Today's design of electronic devices continues to follow the trend of miniaturization, meaning that the various components of the camera module or its structure must also be continuously reduced, so as to achieve miniaturization. In general, a driving mechanism in the camera module has a camera lens holder configured to hold a camera lens, and the driving mechanism can have the functions of auto focusing or optical image stabilization. However, although the existing driving mechanism can achieve the aforementioned functions of photographing or video recording, they still cannot meet all the needs of the users.

Therefore, how to design a camera module capable of being disposed on the front side or the rear side of an electronic device and capable of achieving miniaturization are topics nowadays that need to be discussed and solved.

BRIEF SUMMARY OF THE DISCLOSURE

Accordingly, one objective of the present disclosure is to provide an optical element driving mechanism to solve the above problems.

According to some embodiments of the disclosure, an optical element driving mechanism is provided and includes a fixed assembly, a movable assembly and a connecting assembly. The movable assembly is configured to connect an optical element having an optical axis, and the movable assembly is movable relative to the fixed assembly. The movable assembly is movably connected to the fixed assembly through the connecting assembly.

According to some embodiments, the connecting assembly includes a first elastic unit has a block structure; the first elastic unit does not have a plate-shaped structure; the first elastic unit has a plastic material; the first elastic unit includes a light-curing glue or a heat-curing glue.

According to some embodiments, the first elastic unit includes a plurality of first elastic elements, and when viewed along the optical axis, a center of the movable assembly is located within a polygonal structure formed by the plurality of first elastic elements; when viewed along the optical axis, the center of the movable assembly is located at a center of the polygonal structure; when viewed along the optical axis, the first elastic elements are disposed between the movable assembly and the fixed assembly; when viewed along the optical axis, a first pair of the first elastic elements is disposed at a first corner and a second corner of the movable assembly; the first corner is an opposite corner of the second corner; when viewed along the optical axis, a second pair of the first elastic elements are disposed at a third corner and a fourth corner of the movable assembly; the third corner is an opposite corner of the fourth corner.

According to some embodiments, the optical element driving mechanism further includes a driving assembly configured to drive the movable assembly to move relative to the fixed assembly; the driving assembly includes two magnetic elements disposed on opposite sides of the fixed assembly; a third pair of the first elastic elements are disposed between the two magnetic elements and the movable assembly.

According to some embodiments, the driving assembly includes a driving coil disposed in the movable assembly; a winding axis of the driving coil is not perpendicular to the optical axis; the winding axis of the driving coil is parallel to the optical axis; the first pair and the second pair of the first elastic elements are disposed between the driving coil and the fixed assembly.

According to some embodiments, the connecting assembly includes a second elastic unit having a plate-shaped structure; the second elastic unit is perpendicular to the optical axis; when viewed in a first direction perpendicular to the optical axis, the movable assembly and the optical element form a movable assembly center located between a center of the second elastic unit and a center of the first elastic unit.

According to some embodiments, the fixed assembly further includes a casing, having a top wall having a plate-shaped structure and a side wall having a plate-shaped structure, wherein the top wall is perpendicular to the optical axis, and the side wall is parallel to the optical axis; and a base, fixedly connected to the casing to form an accommodating space for accommodating the movable assembly; the top wall has a first surface facing an incident light, and the first surface has a planar structure and does not have a concave structure; the top wall has a second surface, the first surface and the second surface face the opposite directions, the second surface faces the movable assembly, when viewed along the optical axis, an overlapping portion is defined by the second surface and the movable assembly, and there is no element disposed between the overlapping portion and the movable assembly.

According to some embodiments, the casing has a protruding portion, which extends along the optical axis from the top wall; the movable assembly has a groove configured to accommodate the protruding portion; at least one of the first elastic elements is disposed in the groove and is configured to be connected between the movable assembly and the protruding portion.

According to some embodiments, the driving assembly includes a first driving coil and a second driving coil, which are disposed on opposite sides of the movable assembly; the second elastic unit includes a second elastic element and a third elastic element configured to be electrically connected to the first driving coil and the second driving coil, respectively.

According to some embodiments, the fixed assembly includes a base, and the base has a bottom wall perpendicular to the optical axis; a first distance is formed between the first pair of first elastic elements and the bottom wall along the optical axis; a second distance is formed between the second pair of the first elastic elements and the bottom wall along the optical axis; a third distance is formed between the third pair of the first elastic elements and the bottom wall along the optical axis; the first distance is equal to the second distance, and the second distance is equal to the third distance.

According to some embodiments, the fixed assembly further includes a casing, having a top wall having a plate-shaped structure and a side wall having a plate-shaped structure, wherein the top wall is perpendicular to the optical axis, and the side wall is parallel to the optical axis; and a base, fixedly connected to the casing to form an accommodating space for accommodating the movable assembly; the base includes a bottom wall and at least one connecting member, and the connecting member protrudes from the bottom wall and is perpendicular to the bottom wall; the connecting member includes a first connecting portion and a second connecting portion; the second connecting portion is connected between the first connecting portion and the bottom wall; the bottom wall, the first connecting portion and the second connecting portion are integrally formed in one piece; the casing has a through hole corresponding to the first connecting portion; when the casing is affixed to the base, a terminal of the first connecting portion is configured to pass through the through hole; the terminal is configured to be affixed to the casing by hot press or riveting.

According to some embodiments, a size of the through hole in a first direction is greater than a size of the first connecting portion in a first direction; the first direction is perpendicular to the optical axis; the through hole has a circular or square structure; the first connecting portion has a cylindrical structure, a square pillar structure, or a conical structure corresponding to the through hole; when viewed in the first direction, the terminal has a rectangular structure or a semicircular structure; the top wall is a continuous planar structure, and when viewed in the first direction, the terminal does not overlap the top wall.

According to some embodiments, when viewed along the optical axis, the bottom wall has a polygonal structure; when viewed along the optical axis, the top wall has a polygonal structure corresponding to the bottom wall; the connecting member is located at a corner of the bottom wall; the top wall has a flat portion and a concave portion recessed from the flat portion along the optical axis; the concave portion is located at a corner of the top wall; the through hole is formed on the concave portion; when viewed in a first direction perpendicular to the optical axes, the terminal completely overlaps the flat portion.

According to some embodiments, the fixed assembly further includes a strengthening member disposed in the second connecting portion and the bottom wall; the strengthening member includes a metal material.

According to some embodiments, the casing has a first positioning portion, and the base has a second positioning portion corresponding to the first positioning portion; the first positioning portion is configured to be aligned and coupled to the second positioning portion, so that the casing is affixed to the base.

The present disclosure provides an optical element driving mechanism, which includes a movable assembly, a fixed assembly, and a connecting assembly, and the movable assembly is movably connected to the fixed assembly through the connecting assembly. The connecting assembly includes a first elastic unit, and the first elastic unit may have a plurality of first elastic elements connected between the base and the lens holder. In comparison to the conventional optical element driving mechanism adopting elastic sheets, the optical element driving mechanism of the present disclosure can effectively reduce the height on the Z-axis so as to achieve miniaturization.

In addition, in some embodiments, the base may include a plurality of connecting members, and the casing may correspondingly have a plurality of through holes. The terminal of the first connecting portion of the connecting member is configured to pass through the corresponding through hole, and the terminal is configured to be affixed to the casing by hot press or riveting process. Based on the above structural configuration, it can be ensured that the casing is firmly fixed to the base.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
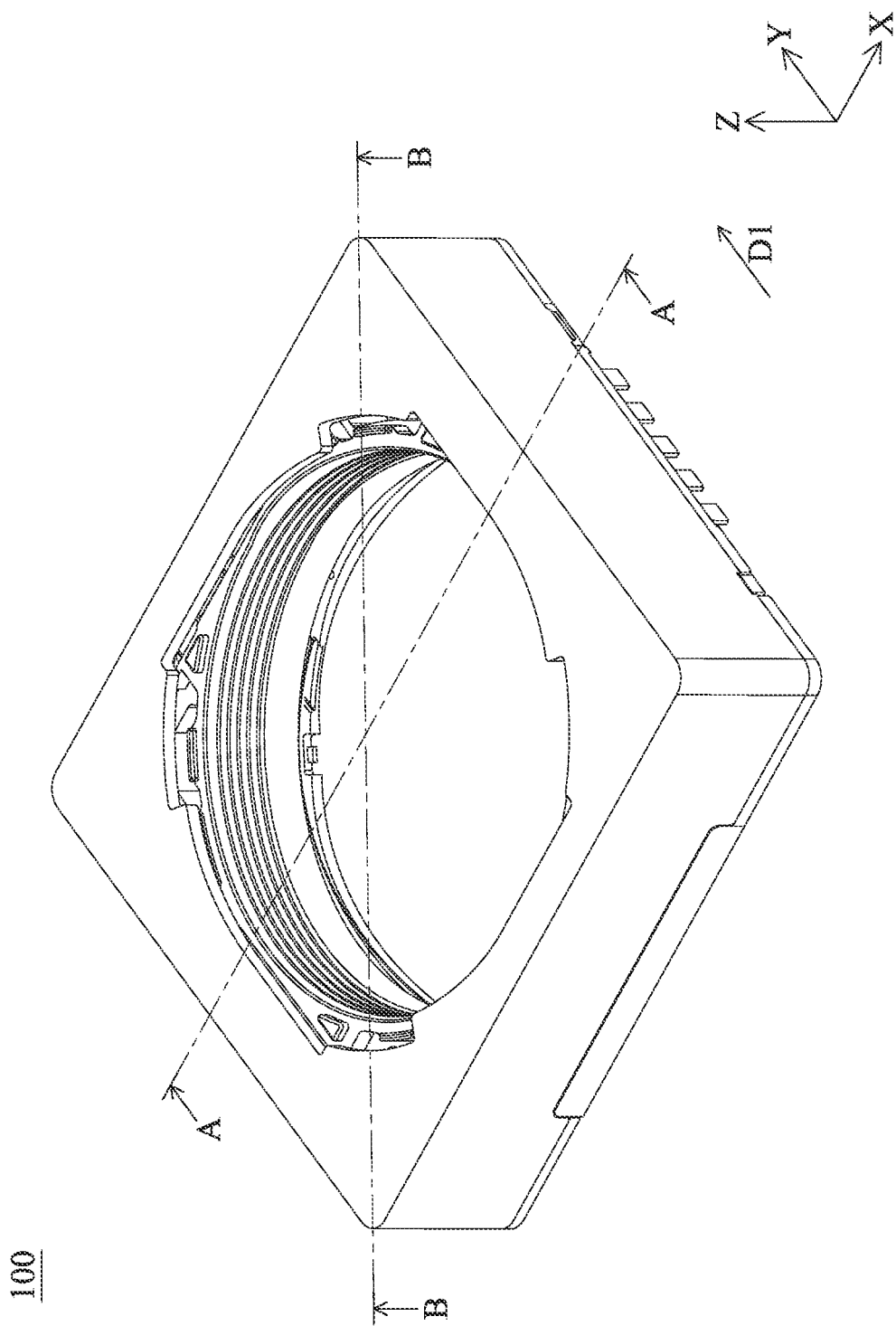
FIG. 1 is a schematic diagram of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
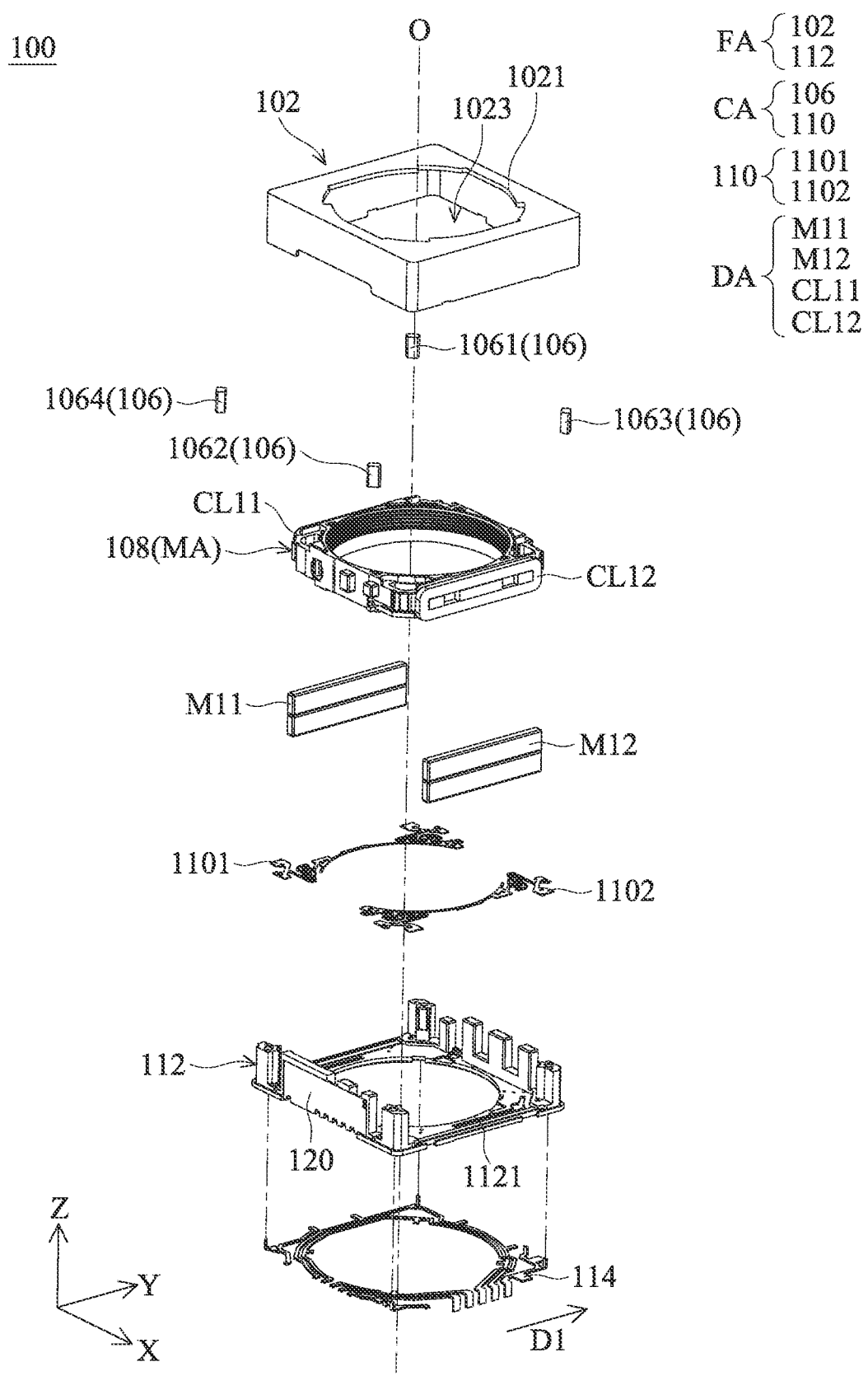
FIG. 2 is an exploded diagram of the optical element driving mechanism 100 according to an embodiment of the present disclosure.
Figure 3:
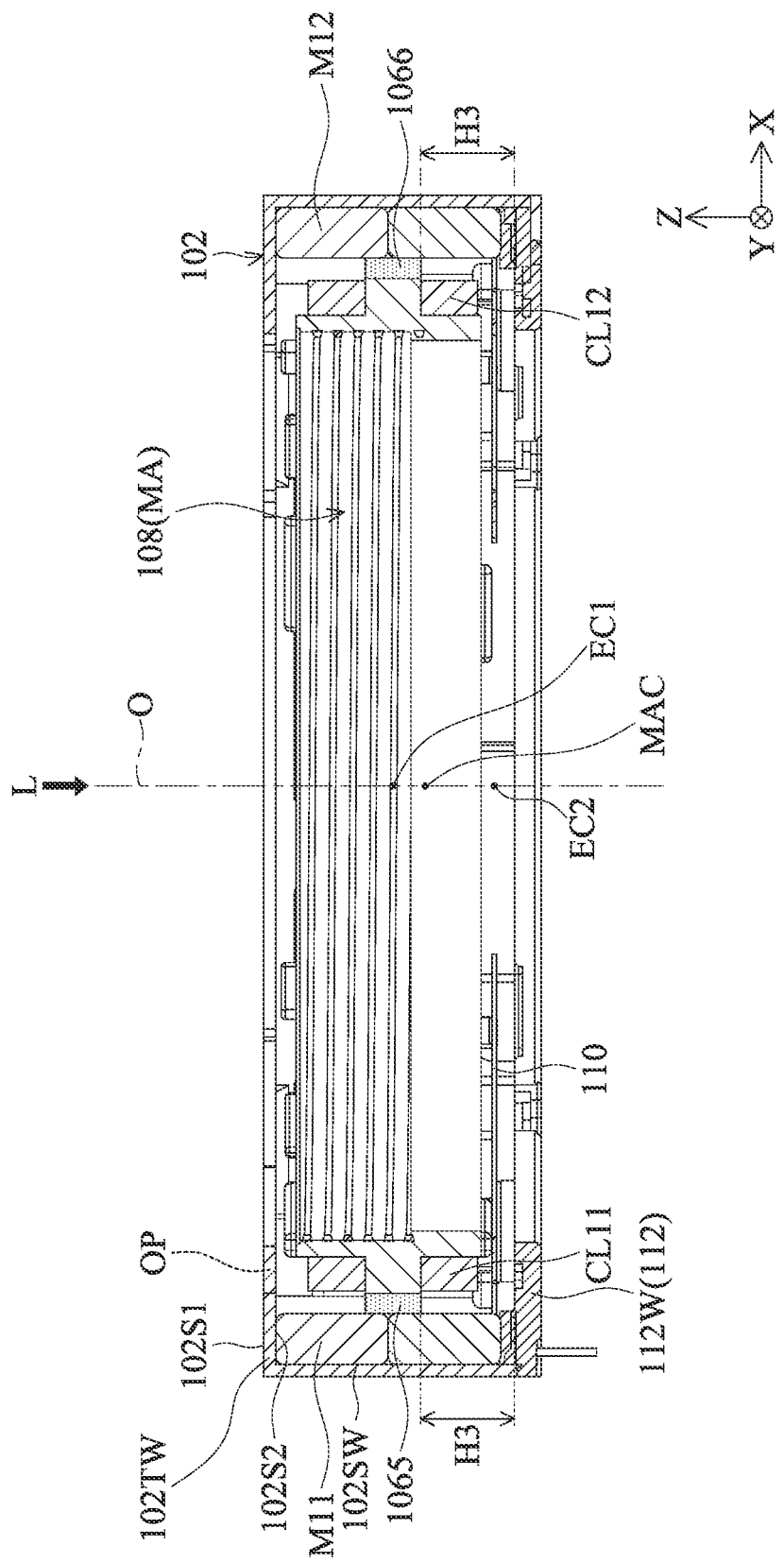
FIG. 3 is a cross-sectional view of the optical element driving mechanism 100 along line A-A in FIG. 1 according to an embodiment of the present disclosure.

Please refer to FIG. 1 to FIG. 3. FIG. 1 is a schematic diagram of an optical element driving mechanism 100 according to an embodiment of the present disclosure, FIG. 2 is an exploded diagram of the optical element driving mechanism 100 according to an embodiment of the present disclosure, and FIG. 3 is a cross-sectional view of the optical element driving mechanism 100 along line A-A in FIG. 1 according to an embodiment of the present disclosure. The optical element driving mechanism 100 can be an optical camera module and can be configured to hold and drive an optical element. The optical element driving mechanism 100 can be installed in various electronic devices or portable electronic devices, such as a smartphone, for allowing a user to perform the image capturing function. In this embodiment, the optical element driving mechanism 100 can be a voice coil motor (VCM) with an auto-focusing (AF) function, but it is not limited thereto. In other embodiments, the optical element driving mechanism 100 can also perform the functions of auto-focusing and optical image stabilization (OIS).

In this embodiment, the optical element driving mechanism 100 may include a fixed assembly FA, a movable assembly MA, a connecting assembly CA and a driving assembly DA. The movable assembly MA is movably connected to the fixed assembly FA through the connecting assembly CA, and the movable assembly MA is configured to hold an optical element (not shown in the figures). The driving assembly DA is configured to drive the movable assembly MA to move relative to the fixed assembly FA.

In this embodiment, as shown in FIG. 2, the fixed assembly FA includes a casing 102 and a base 112, and the movable assembly MA includes a lens holder 108, and the aforementioned optical element, and the lens holder 108 is used to hold the optical element.

As shown in FIG. 2, the casing 102 has a hollow structure, and a casing opening 1021 is formed on the casing 102. A base opening 1121 is formed on the base 112. The center of the casing opening 1021 corresponds to an optical axis O of the optical element, and the base opening 1121 corresponds to a photosensitive element (now shown in the figures) disposed below the base 112. The external light can enter the casing 102 through the optical element and then is received by the aforementioned photosensitive element after passing through the base opening 1121 so as to generate a digital image signal.

Furthermore, the casing 102 is disposed on the base 112, and may have an accommodating space 1023 for accommodating the movable assembly MA (including the aforementioned optical element and the lens holder 108), the connecting assembly CA and the driving assembly DA.

The connecting assembly CA may include a first elastic unit 106 and a second elastic unit 110. The first elastic unit 106 is fixed between the base 112 and the movable assembly MA, the outer part (the outer ring portion) of the second elastic unit 110 is affixed to the base 112, and the inner part (the inner ring portion) of the second elastic unit 110 is connected to the lower side of the lens holder 108. Based on the configuration of the first elastic unit 106 and the second elastic unit 110, the lens holder 108 can be suspended in the accommodating space 1023.

In this embodiment, the driving assembly DA may include a first magnet M11 (the magnetic element), a second magnet M12 (the magnetic element), a first coil CL11, and a second coil CL12. The first coil CL11 (the first driving coil) and the second coil CL12 (the second driving coil) are disposed on the lens holder 108, and the first magnet M11 and the second magnet M12 respectively correspond to the first coil CL11 and the second coil CL12. The first magnet M11 and the second magnet M12 are disposed on the inner wall surface of the casing 102. The first magnet M11 and the second magnet M12 are disposed on opposite sides of the fixed assembly FA.

In this embodiment, the first coil CL11 and the second coil CL12 can be wound coils and are disposed on opposite sides of the lens holder 108. When the first coil CL11 and the second coil CL12 are provided with electricity, the first magnet M11 and the second magnet M12 respectively act with the first coil CL11 and the second coil CL12 to generate an electromagnetic driving force, thereby driving the lens holder 108 and the held optical element to move along the optical axis O (the Z-axis) relative to the base 112.

It is worth noting that, as shown in FIG. 2, the second elastic unit 110 has a plate-shaped structure, such as extending along the XY plane, and the second elastic unit 110 is perpendicular to the optical axis O. Specifically, the second elastic unit 110 includes a second elastic element 1101 and a third elastic element 1102, which are configured to be electrically connected to the first driving coil (the first coil CL11) and the second driving coil (the second coil CL12), respectively.

In addition, the optical element driving mechanism 100 may further include a circuit assembly 120 electrically connected to the driving assembly DA. The circuit assembly 120 may be a circuit board, such as a flexible circuit board, but it is not limited thereto.

Figure 4:
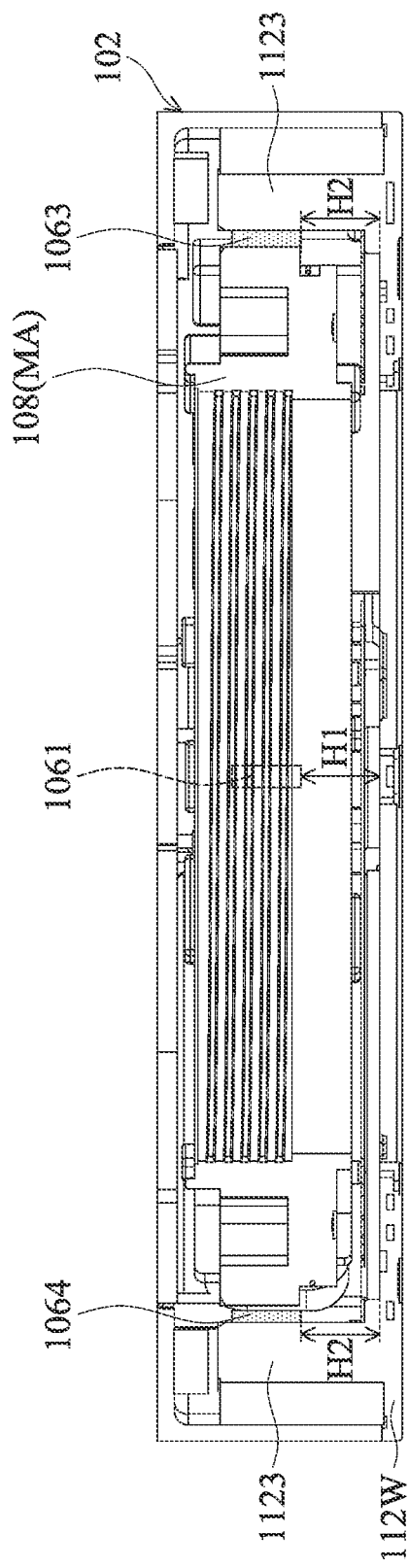
FIG. 4 is a cross-sectional view of the optical element driving mechanism 100 along line B-B in FIG. 1 according to an embodiment of the present disclosure.
Figure 5:
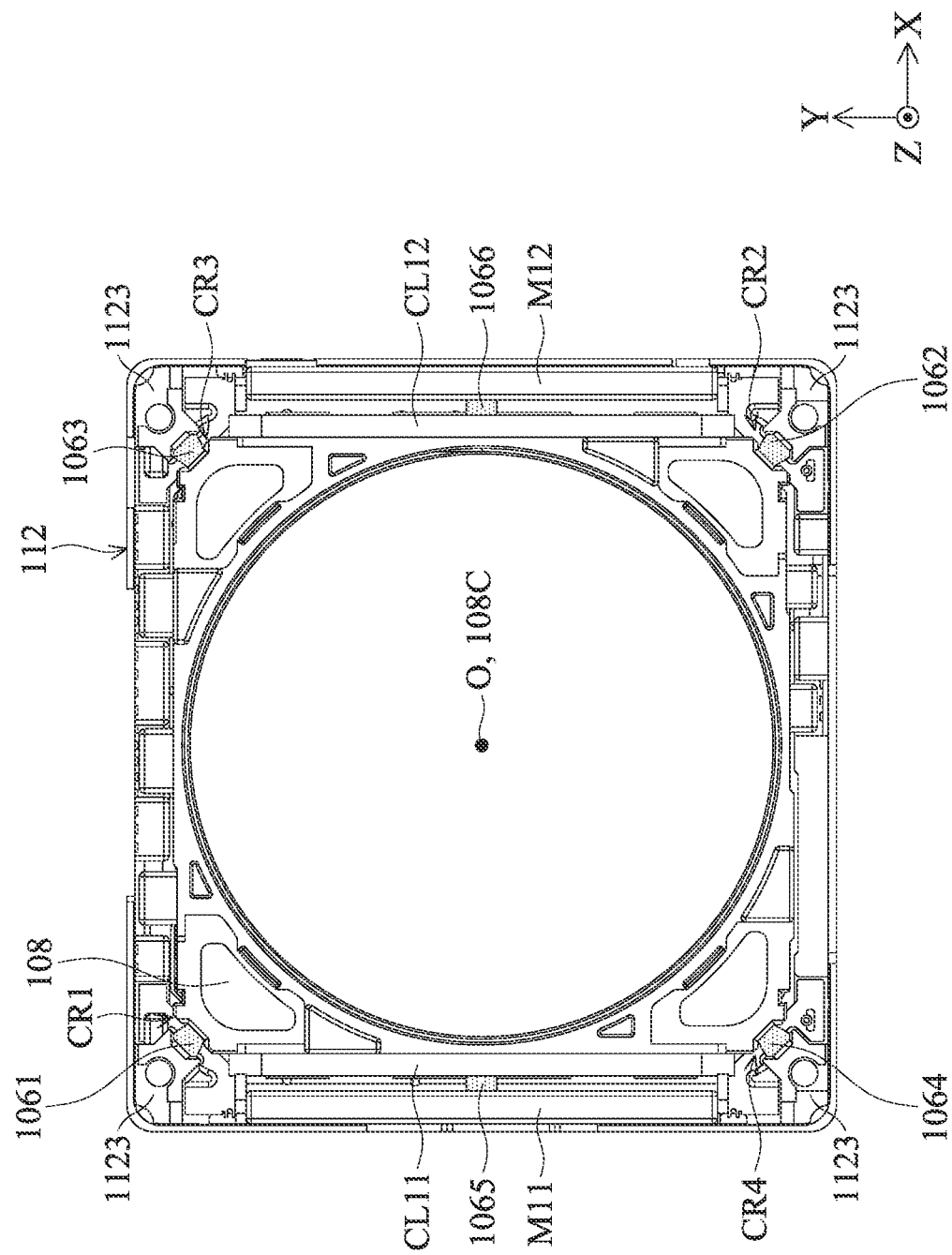
FIG. 5 is a top view of the partial structure of the optical element driving mechanism 100 according to an embodiment of the present disclosure.

Please refer to FIG. 2 to FIG. 5. FIG. 4 is a cross-sectional view of the optical element driving mechanism 100 along line B-B in FIG. 1 according to an embodiment of the present disclosure, and FIG. 5 is a top view of the partial structure of the optical element driving mechanism 100 according to an embodiment of the present disclosure. In this embodiment, the first elastic unit 106 may have a block structure, and the first elastic unit 106 does not have a plate-shaped structure. That is, the first elastic unit 106 and the second elastic unit 110 have different structures.

In this embodiment, the first elastic unit 106 may have a plastic material. For example, the first elastic unit 106 may be a light-curing glue (UV curing) or a heat-curing glue, but it is not limited thereto. For example, as shown in FIG. 5, the first elastic unit 106 may include a plurality of first elastic elements 1061 to 1064, and when viewed along the optical axis O, the center 108C of the lens holder 108 of the movable assembly MA is located within a polygonal structure formed by the first elastic elements 1061 to 1064.

When viewed along the optical axis O, the center 108C of the lens holder 108 of the movable assembly MA is located at the center of the polygonal structure. When viewed along the optical axis O, these first elastic elements 1061 to 1064 are disposed between the lens holder 108 of the movable assembly MA and the base 112 of the fixed assembly FA.

Specifically, the base 112 may have a rectangular structure, and the base 112 may have four connecting members 1123 formed at four corners of the rectangular structure. The connecting members 1123 may be, for example, protruding columns, and the first elastic elements 1061 to 1064 are disposed between the lens holder 108 and the four connecting members 1123.

It should be noted that, as shown in FIG. 5, each first elastic element may have a long strip structure, and its extending direction is not parallel to the optical axis O, for example, perpendicular to the optical axis O.

As shown in FIG. 5, when viewed along the optical axis O, a first pair of the first elastic elements (the first elastic element 1061 and the first elastic element 1062) is disposed at a first corner CR1 and a second corner CR2 of the lens holder 108 of the movable assembly MA, and the first corner CR1 is the opposite corner of the second corner CR2.

Furthermore, when viewed along the optical axis O, a second pair of the first elastic elements (the first elastic element 1063 and the first elastic element 1064) is disposed at a third corner CR3 and a fourth corner CR4 of the lens holder 108 of the movable assembly MA, and the third corner CR3 is the opposite corner of the fourth corner CR4.

It should be noted that in some embodiments of the present disclosure, the optical element driving mechanism 100 may only dispose the first elastic element 1061 and the first elastic element 1062 at the first corner CR1 and the second corner CR2 without disposing other elastic elements.

Furthermore, as shown in FIG. 4 and FIG. 5, the first elastic unit 106 may further include a third pair of the first elastic elements (the first elastic element 1065 and the first elastic element 1066), which is disposed between two magnetic elements (the first magnet M11 and the second magnet M12) and the lens holder 108 of the movable assembly MA. Based on the above-mentioned structural configuration, the stability of the first elastic unit 106 holding the lens holder 108 can be further increased.

As shown in FIG. 3, when viewed in a first direction D1 (such as the Y-axis), perpendicular to the optical axis O, the lens holder 108 of the movable assembly MA and the optical element form a movable assembly center MAC which is located between the center EC2 of the second elastic unit 110 and the center EC1 of the first elastic unit 106.

Based on the above structural configuration, when the lens holder 108 moves along the optical axis O, the first elastic elements do not contact the second elastic unit 110, so that the problem of damage of the first elastic elements and the second elastic unit 110 can be avoided.

As shown in FIG. 3 and FIG. 4, the base has a bottom wall 112W perpendicular to the optical axis O. A first distance H1 is formed between the first pair of the first elastic elements and the bottom wall 112W along the optical axis O, a second distance H2 is formed between the second pair of the first elastic elements and the bottom wall 112W along the optical axis O, and a third distance H3 is formed between the third pair of the first elastic elements and the bottom wall 112W along the optical axis O.

The first distance H1 is equal to the second distance H2, and the second distance H2 is equal to the third distance H3. That is, the distances between all the first elastic elements and the bottom wall 112W are the same so as to ensure the stability of the lens holder 108 during movement.

Figure 6:
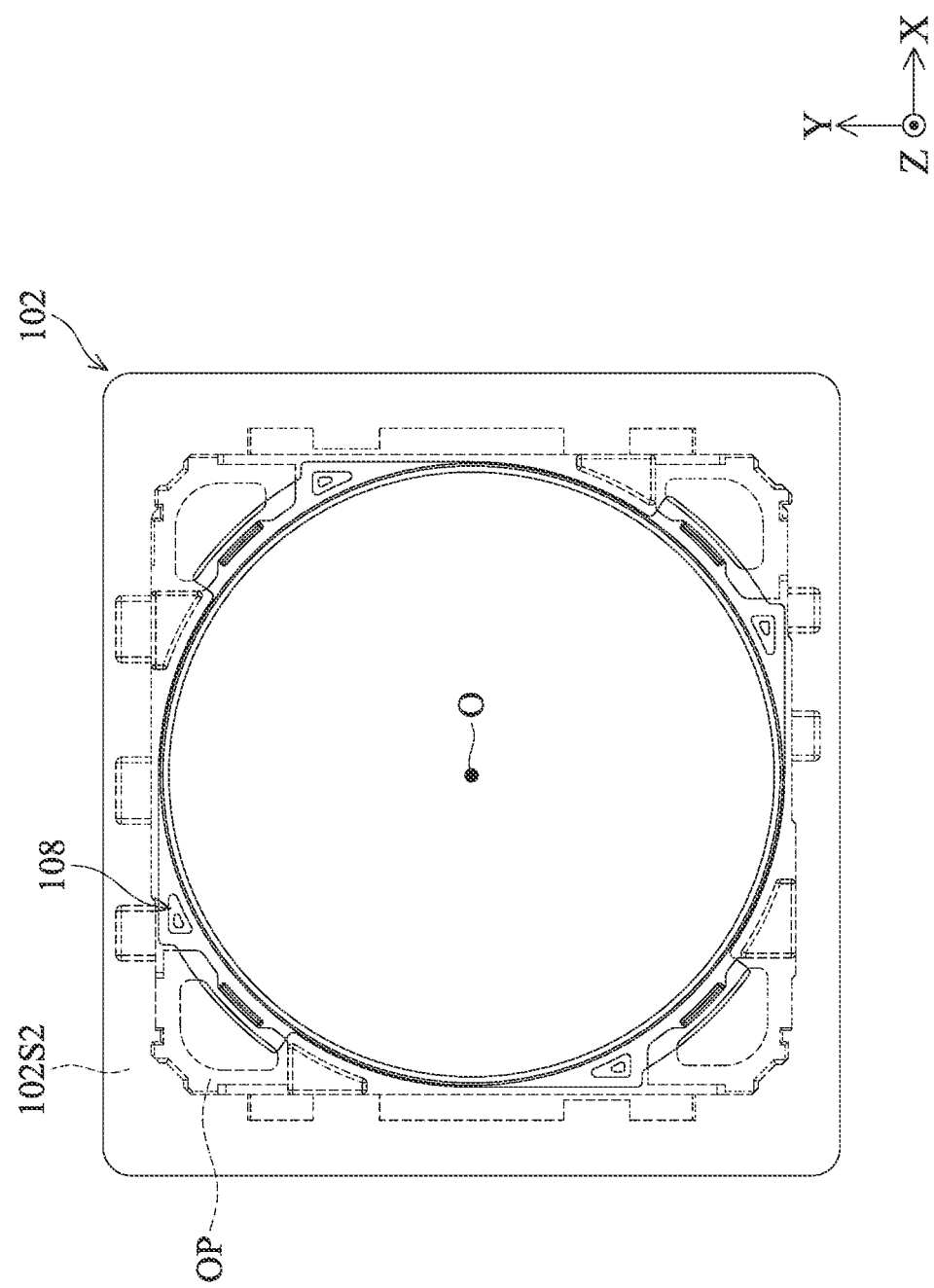
FIG. 6 is a top view of a partial structure of the optical element driving mechanism 100 according to an embodiment of the present disclosure.

Please refer to FIG. 2 and FIG. 6, and FIG. 6 is a top view of a partial structure of the optical element driving mechanism 100 according to an embodiment of the present disclosure. As shown in FIG. 2, the casing 102 has a top wall 102TW having a plate-shaped structure and a side wall 102SW having a plate-like structure. The top wall 102TW is perpendicular to the optical axis O, and the side wall 102SW is parallel to the optical axis O. Furthermore, the base 112 is fixedly connected to the casing 102 to form the accommodating space 1023 for accommodating the movable assembly MA.

As shown in the figures, the top wall 102TW has a first surface 102S1 which faces an incident light L. The first surface 102S1 has a planar structure and does not have a concave structure. The top wall 102TW may further have a second surface 102S2, and the first surface 102S1 and the second surface 102S2 face the opposite directions. Specifically, the second surface 102S2 faces the lens holder 108 of the movable assembly MA.

Furthermore, as shown in FIG. 6, when viewed along the optical axis O, an overlapping portion OP is defined by the second surface 102S2 and the lens holder 108 of the movable assembly MA. In addition, as shown in FIG. 3, there is no element disposed between the overlapping portion OP and the lens holder 108 of the movable assembly MA. Moreover, the first magnet M11 and the second magnet M12 can be in contact with the second surface 102S2.

Figure 7:
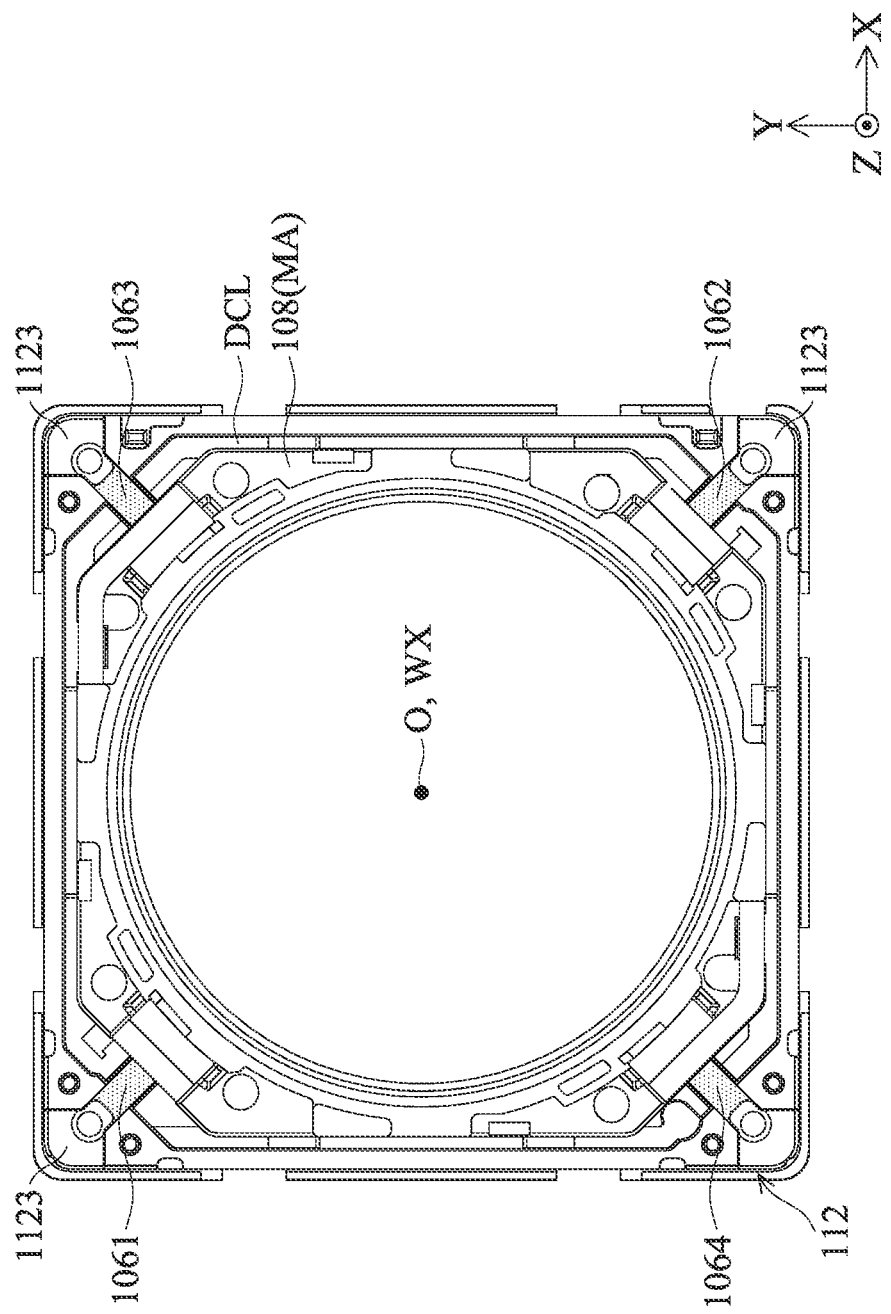
FIG. 7 is a top view of a partial structure of the optical element driving mechanism 100 according to another embodiment of the present disclosure.

Please refer to FIG. 7, which is a top view of a partial structure of the optical element driving mechanism 100 according to another embodiment of the present disclosure. In this embodiment, the driving assembly DA may include a single driving coil DCL disposed on the lens holder 108 of the movable assembly MA.

A winding axis WX of the driving coil DCL is not perpendicular to the optical axis O. For example, the winding axis WX of the driving coil DCL may be parallel to the optical axis O. In this embodiment, the winding axis WX may overlap the optical axis O. In addition, as shown in FIG. 7, the first pair and the second pair of these first elastic elements are disposed between the driving coil DCL and the base 112 of the fixed assembly FA.

Figure 8:
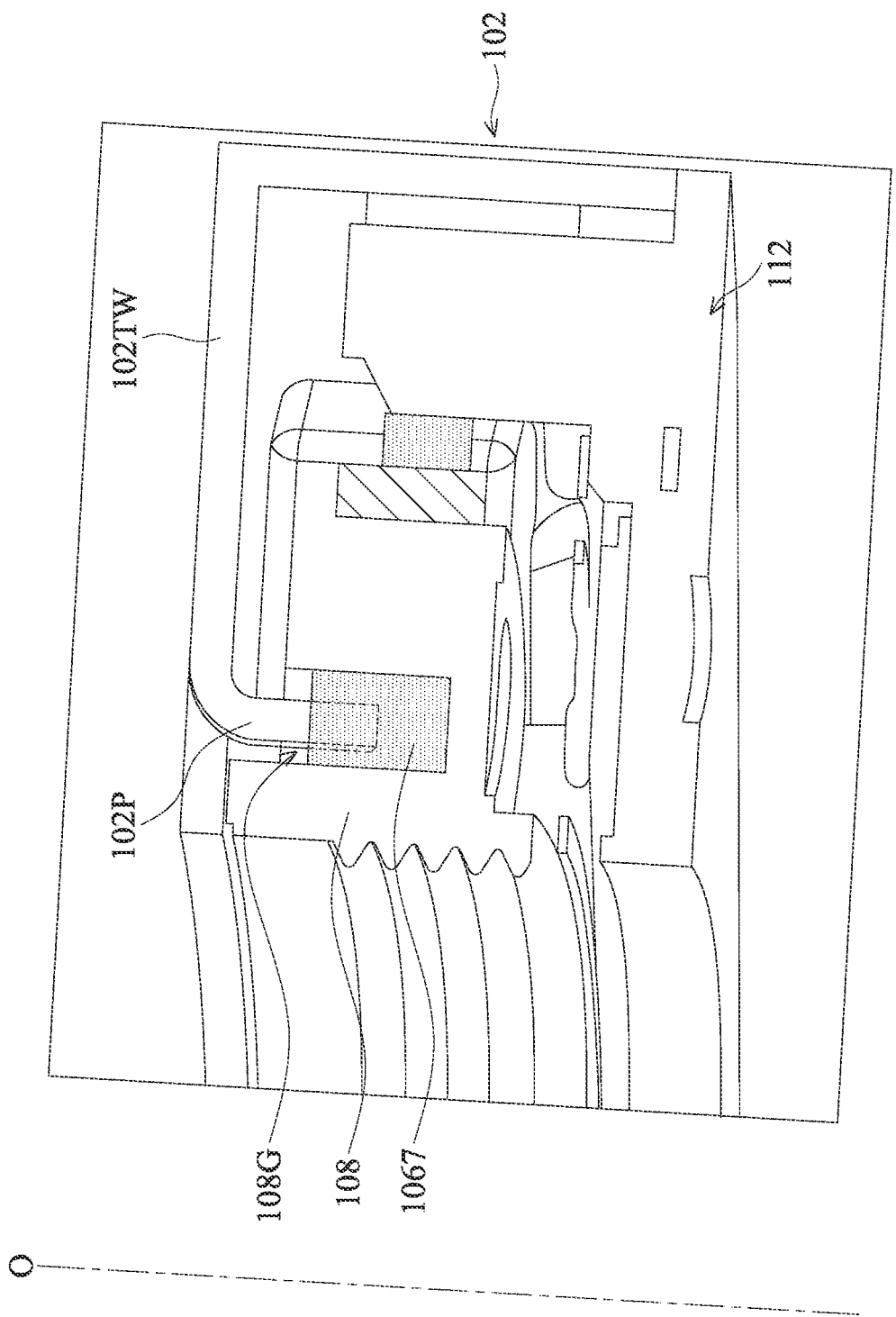
FIG. 8 is a cross-sectional view of a partial structure of the optical element driving mechanism 100 according to another embodiment of the present disclosure.

Next, please refer to FIG. 8, and FIG. 8 is a cross-sectional view of a partial structure of the optical element driving mechanism 100 according to another embodiment of the present disclosure. The casing 102 has a protruding portion 102P, which extends along the optical axis O from the top wall 102TW. The lens holder 108 of the movable assembly MA has a groove 108G configured to accommodate a protruding portion 102P.

Furthermore, at least one of these first elastic elements (such as the first elastic element 1067) is disposed in the groove 108G and is configured to be connected between the lens holder 108 of the movable assembly MA and the protruding portion 102P. Based on the above structural configuration, the stability of the lens holder 108 during movement can be further improved.

Figure 9:
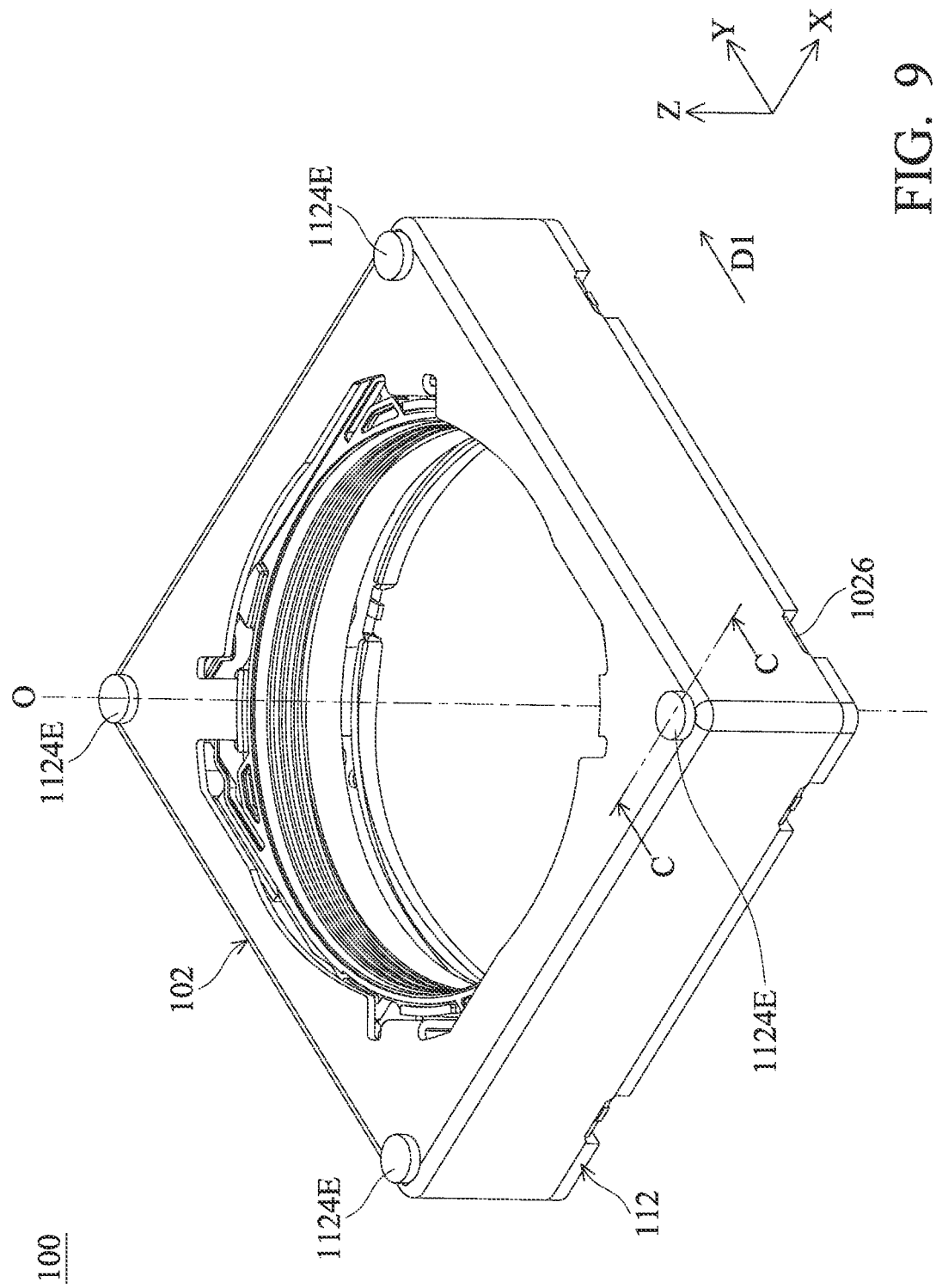
FIG. 9 is a schematic diagram of the optical element driving mechanism 100 according to another embodiment of the present disclosure.
Figure 10:
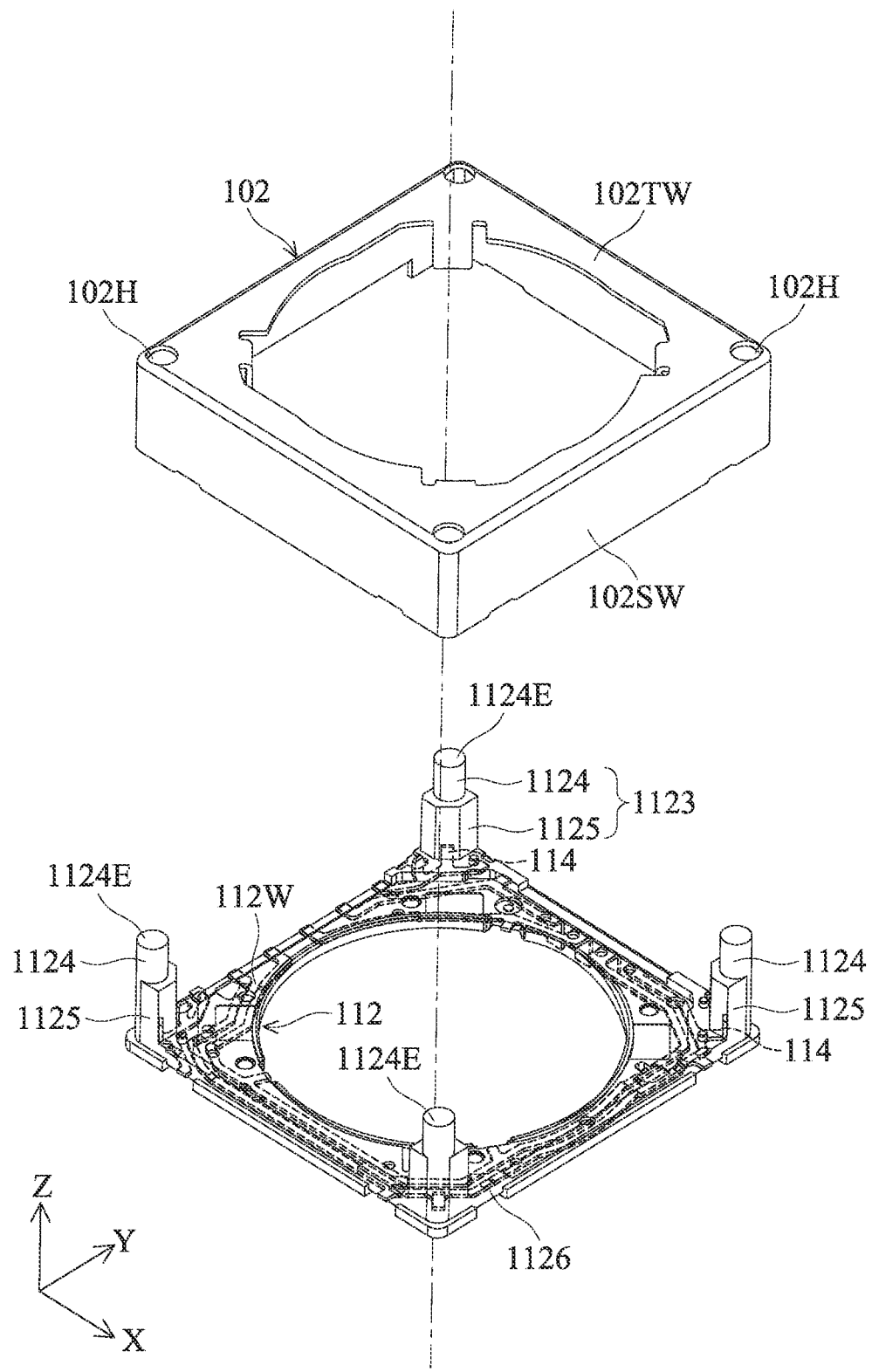
FIG. 10 is an exploded diagram of a partial structure of the optical element driving mechanism 100 according to another embodiment of the present disclosure.

Please refer to FIG. 9 and FIG. 10. FIG. 9 is a schematic diagram of the optical element driving mechanism 100 according to another embodiment of the present disclosure, and FIG. 10 is an exploded diagram of a partial structure of the optical element driving mechanism 100 according to another embodiment of the present disclosure. The base 112 includes the bottom wall 112W and at least one connecting member 1123. In this embodiment, the base 112 includes four connecting members 1123, which protrude from the bottom wall 112W and are perpendicular to the bottom wall 112W.

As shown in FIG. 10, each of the connecting members 1123 may include a first connecting portion 1124 and a second connecting portion 1125, and the second connecting portion 1125 is connected between the first connecting portion 1124 and the bottom wall 112W. In this embodiment, the bottom wall 112W, the first connecting portion 1124 and the second connecting portion 1125 may be integrally formed in one piece. For example, the first connecting portion 1124 and the second connecting portion 1125 can be implemented by injection molding technology, but it is not limited thereto.

As shown in FIG. 10, the casing 102 may have four through holes 102H passing through the top wall 102TW, and the four through holes 102H respectively correspond to the four first connecting portions 1124. As shown in FIG. 9 and FIG. 10, when the casing 102 is affixed to the base 112, a terminal 1124E of the first connecting portions 1124 is configured to pass through the corresponding through hole 102H, and the terminal 1124E is configured to be affixed to the casing 102 by hot press or riveting method.

Figure 11:
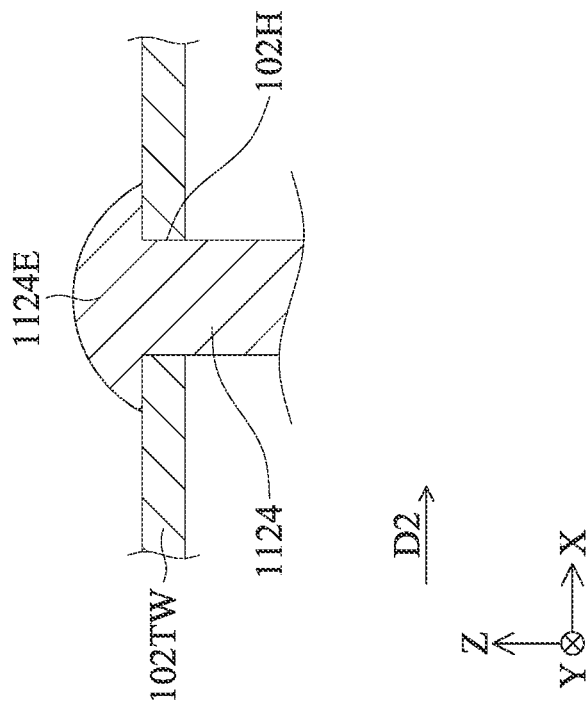
FIG. 11 is a cross-sectional view of the optical element driving mechanism 100 along the line C-C in FIG. 9 according to another embodiment of the present disclosure.
Figure 12:
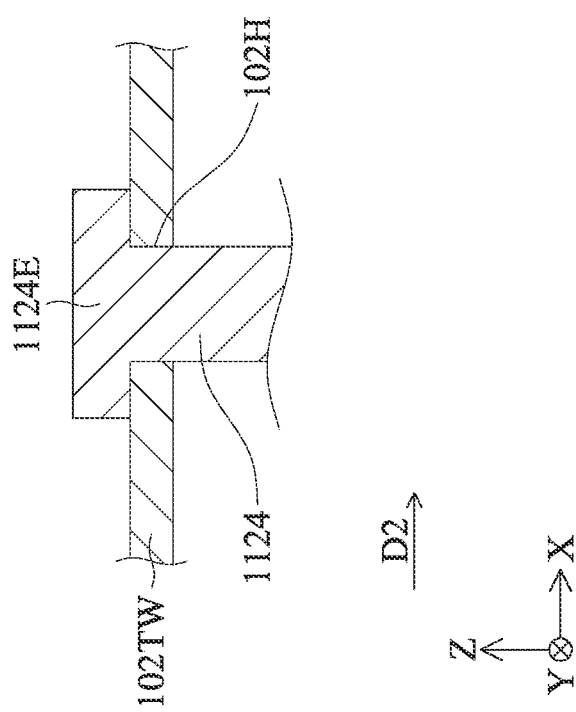
FIG. 12 is a cross-sectional view of the terminal 1124E and the through hole 102H according to another embodiment of the present disclosure.

Please refer to FIG. 9 to FIG. 12 together. FIG. 11 is a cross-sectional view of the optical element driving mechanism 100 along the line C-C in FIG. 9 according to another embodiment of the present disclosure, and FIG. 12 is a cross-sectional view of the terminal 1124E and the through hole 102H according to another embodiment of the present disclosure. In this embodiment, the size of the through hole 102H is greater than the size of the first connecting portion 1124.

For example, the size of the through hole 102H in the first direction D1 is greater than the size of the first connecting portion 1124 in the first direction D1. The first direction D1 is perpendicular to the optical axis O. In addition, as shown in FIG. 11 and FIG. 12, the size of the through hole 102H in a second direction D2 (the X-axis) is greater than the size of the first connecting portion 1124 in the second direction D2, and the second direction D2 is perpendicular to the first direction D1.

In the present disclosure, the through hole 102H may have a circular or square structure, and the first connecting portion 1124 may have a cylindrical structure or a square pillar structure, corresponding to the through hole 102H. In addition, in some embodiments, the first connecting portion 1124 may also have a conical structure. That is, the terminal 1124E can be a tip.

As shown in FIG. 11 and FIG. 12, when viewed in the first direction D1 (the Y-axis), the terminal 1124E has a rectangular structure or a semicircular structure. Furthermore, as shown in FIG. 9, when viewed along the optical axis O, the terminal 1124E has a circular structure. In this embodiment, the top wall 102TW is a continuous planar structure, and when viewed in the first direction D1, the terminal 1124E does not overlap the top wall 102TW.

Based on the above structural configuration, it can be ensured that the casing 102 is firmly affixed to the base 112 so as to avoid the problem of the casing 102 being separated from the base 112 due to an impact.

In addition, as shown in FIG. 9 and FIG. 10, the casing 102 has a first positioning portion 1026, and the base 112 has a second positioning portion 1126 corresponding to the first positioning portion 1026. The first positioning portion 1026 is configured to be aligned to and coupled to the second positioning portion 1126 so that the casing 102 is affixed to the base 112. For example, the first positioning portion 1026 and the second positioning portion 1126 are engaging structures matching each other, but they are not limited thereto.

Please return to FIG. 2 and FIG. 10. In some embodiments, the optical element driving mechanism 100 may further include a strengthening member 114, and at least a part of the strengthening member 114 is embedded in the base 112. The strengthening member 114 may be made of a metal material.

Furthermore, for example, the base 112 is made of a plastic material, and the strengthening member 114 is formed in the base 112 by a molded interconnect device (MID) technology.

In the embodiment of FIG. 10, the strengthening member 114 may be disposed in the second connecting portion 1125 and the bottom wall 112W, but it is not limited thereto. For example, a part of the strengthening member 114 may also be disposed in the first connecting portion 1124. Based on this structural configuration, the structural strength of the connecting member 1123 can be increased to ensure that the connecting member 1123 is not damaged during the hot press process or the riveting process.

Figure 13:
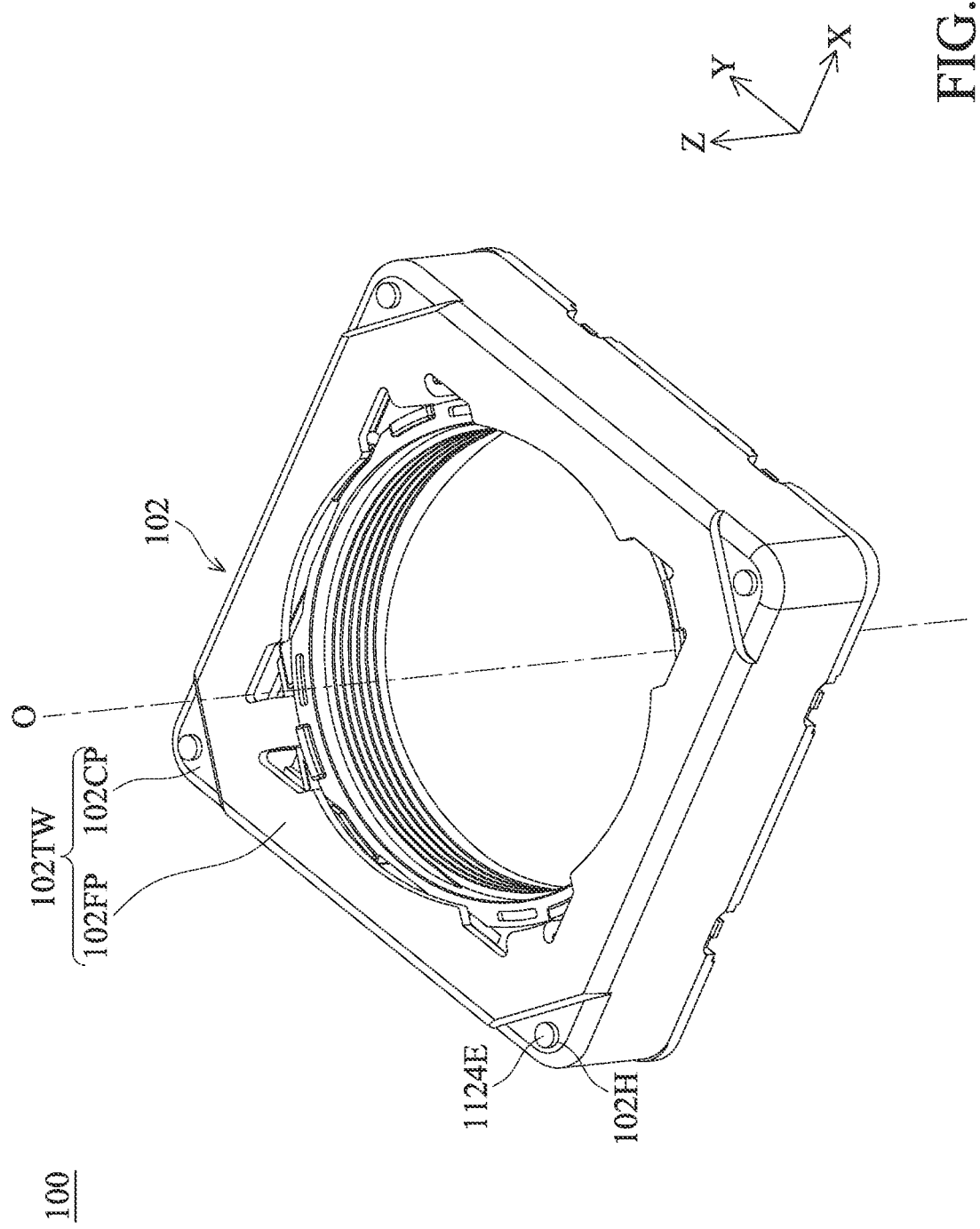
FIG. 13 is a schematic diagram of the optical element driving mechanism 100 according to another embodiment of the present disclosure.
Figure 14:
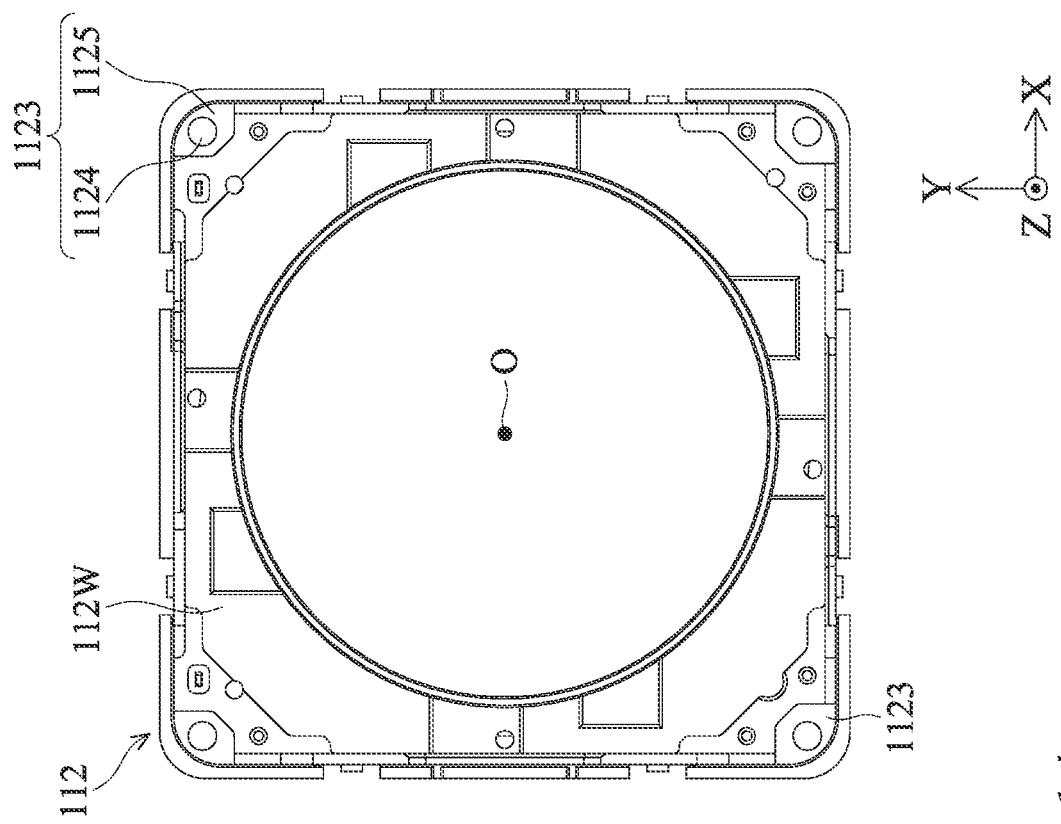
FIG. 14 is a top view of the casing 102 and the base 112 according to another embodiment of the present disclosure.
Figure 14:
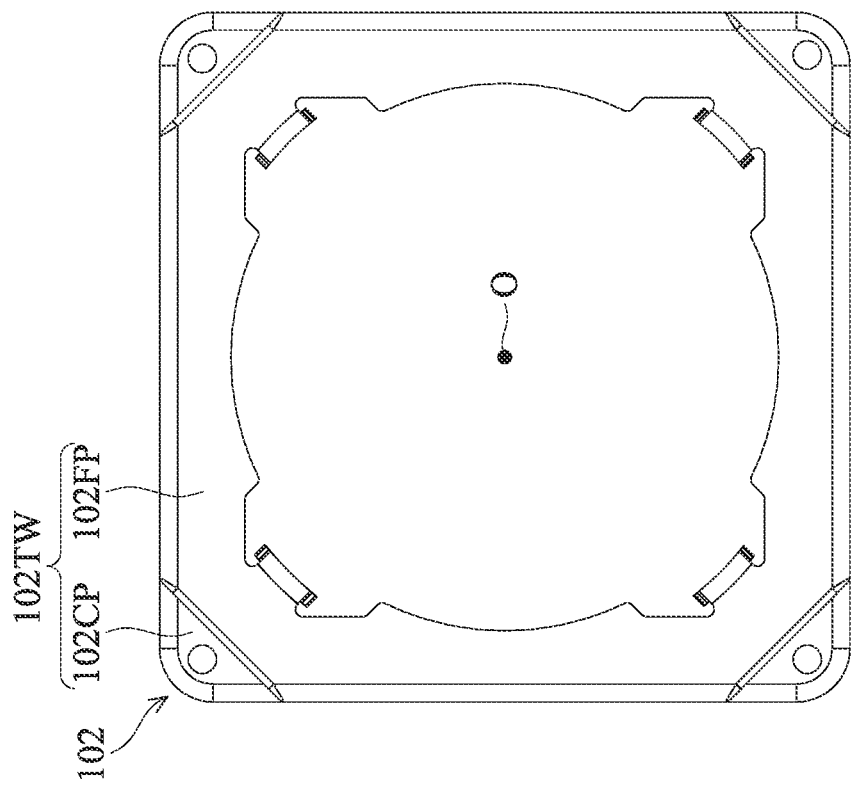
Figure 15:
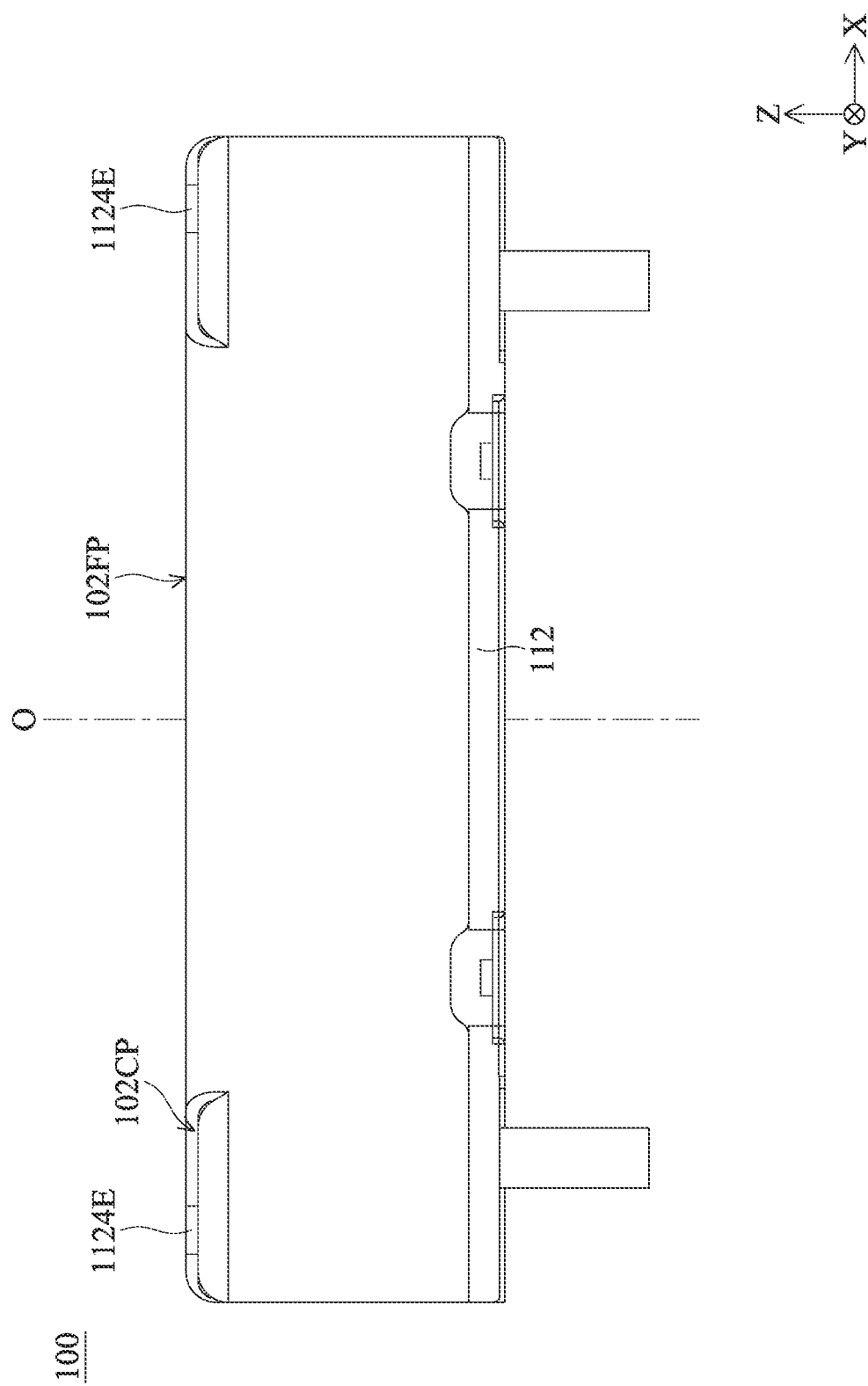
FIG. 15 is a front view of the optical element driving mechanism 100 according to another embodiment of the present disclosure.

Please refer to FIG. 13 to FIG. 15. FIG. 13 is a schematic diagram of the optical element driving mechanism 100 according to another embodiment of the present disclosure, FIG. 14 is a the top view of the casing 102 and the base 112 according to another embodiment of the present disclosure, and FIG. 15 is a front view of the optical element driving mechanism 100 according to another embodiment of the present disclosure. As shown in FIG. 14, when viewed along the optical axis O, the bottom wall 112W has a polygonal structure, such as a rectangular structure.

Furthermore, when viewed along the optical axis O, the top wall 102TW has a polygonal structure corresponding to the bottom wall 112W, such as a rectangular structure. The connecting member 1123 can be located at a corner of bottom wall 112W. Specifically, the four connecting members 1123 are respectively located at the four corners of the bottom wall 112W.

As shown in FIG. 13 and FIG. 14, the top wall 102TW has a flat portion 102FP and a concave portion 102CP recessed from the flat portion 102FP along the optical axis O, and the concave portion 102CP is located at a corner of the top wall 102TW. Specifically, four concave portions 102CP are formed on the top wall 102TW and are respectively located at the four corners of the top wall 102TW.

The through hole 102H is formed on the concave portion 102CP, and as shown in FIG. 15, when viewed in the first direction D1 perpendicular to the optical axis O, the terminal 1124E completely overlaps the flat portion 102FP. Based on the above structural design, it can avoid the problem of damage caused by the collision of the terminal 1124E with other electronic components when the optical element driving mechanism 100 is installed in an electronic device (such as a smart phone).

In summary, the present disclosure provides an optical element driving mechanism 100, which includes a movable assembly MA, a fixed assembly FA, and a connecting assembly CA, and the movable assembly MA is movably connected to the fixed assembly FA through the connecting assembly CA. The connecting assembly CA includes a first elastic unit 106, and the first elastic unit 106 may have a plurality of first elastic elements connected between the base 112 and the lens holder 108. In comparison to the conventional optical element driving mechanism adopting elastic sheets, the optical element driving mechanism 100 of the present disclosure can effectively reduce the height on the Z-axis so as to achieve miniaturization.

In addition, in some embodiments, the base 112 may include a plurality of connecting members 1123, and the casing 102 may correspondingly have a plurality of through holes 102H. The terminal 1124E of the first connecting portion 1124 of the connecting member 1123 is configured to pass through the corresponding through hole 102H, and the terminal 1124E is configured to be affixed to the casing 102 by hot press or riveting process. Based on the above structural configuration, it can be ensured that the casing 102 is firmly fixed to the base 112.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
a fixed assembly:
a movable assembly, configured to connect an optical element having an optical axis, wherein the movable assembly is movable relative to the fixed assembly; and
a connecting assembly, wherein the movable assembly is movably connected to the fixed assembly through the connecting assembly,
wherein the connecting assembly includes a first elastic unit having a block structure;
the first elastic unit does not have a plate-shaped structure;
the first elastic unit has a plastic material;
the first elastic unit includes a light-curing glue or a heat-curing glue.

2. The optical element driving mechanism as claimed in claim 1, wherein the first elastic unit includes a plurality of first elastic elements, and when viewed along the optical axis, a center of the movable assembly is located within a polygonal structure formed by the plurality of first elastic elements;
when viewed along the optical axis, the center of the movable assembly is located at a center of the polygonal structure;
when viewed along the optical axis, the first elastic elements are disposed between the movable assembly and the fixed assembly;
when viewed along the optical axis, a first pair of the first elastic elements is disposed at a first corner and a second corner of the movable assembly;
the first corner is an opposite corner of the second corner;
when viewed along the optical axis, a second pair of the first elastic elements is disposed at a third corner and a fourth corner of the movable assembly;
the third corner is an opposite corner of the fourth corner.

3. The optical element driving mechanism as claimed in claim 2, wherein the optical element driving mechanism further includes a driving assembly configured to drive the movable assembly to move relative to the fixed assembly;
the driving assembly includes two magnetic elements disposed on opposite sides of the fixed assembly;
a third pair of the first elastic elements is disposed between the two magnetic elements and the movable assembly.

4. The optical element driving mechanism as claimed in claim 3, wherein the driving assembly includes a driving coil disposed in the movable assembly;
a winding axis of the driving coil is not perpendicular to the optical axis;
the winding axis of the driving coil is parallel to the optical axis;
the first pair and the second pair of the first elastic elements are disposed between the driving coil and the fixed assembly.

5. The optical element driving mechanism as claimed in claim 3, wherein the connecting assembly includes:
a second elastic unit having a plate-shaped structure;
the second elastic unit is perpendicular to the optical axis;
when viewed in a first direction perpendicular to the optical axis, the movable assembly and the optical element form a movable assembly center located between a center of the second elastic unit and a center of the first elastic unit.

6. The optical element driving mechanism as claimed in claim 5, wherein the fixed assembly further includes:
a casing, having a top wall having a plate-shaped structure and a side wall having a plate-shaped structure, wherein the top wall is perpendicular to the optical axis, and the side wall is parallel to the optical axis; and
a base, fixedly connected to the casing to form an accommodating space for accommodating the movable assembly;
the top wall has a first surface facing an incident light, and the first surface has a planar structure and does not have a concave structure;
the top wall has a second surface, the first surface and the second surface face the opposite directions, the second surface faces the movable assembly, when viewed along the optical axis, an overlapping portion is defined by the second surface and the movable assembly, and there is no element disposed between the overlapping portion and the movable assembly.

7. The optical element driving mechanism as claimed in claim 6, wherein the casing has a protruding portion, which extends along the optical axis from the top wall;
the movable assembly has a groove configured to accommodate the protruding portion;
at least one of the first elastic elements is disposed in the groove and is configured to be connected between the movable assembly and the protruding portion.

8. The optical element driving mechanism as claimed in claim 5, wherein the driving assembly includes a first driving coil and a second driving coil, which are disposed on opposite sides of the movable assembly;
the second elastic unit includes a second elastic element and a third elastic element configured to be electrically connected to the first driving coil and the second driving coil, respectively.

9. The optical element driving mechanism as claimed in claim 5, wherein the fixed assembly includes a base, and the base has a bottom wall perpendicular to the optical axis;
a first distance is formed between the first pair of first elastic elements and the bottom wall along the optical axis;
a second distance is formed between the second pair of the first elastic elements and the bottom wall along the optical axis;
a third distance is formed between the third pair of the first elastic elements and the bottom wall along the optical axis;
the first distance is equal to the second distance, and the second distance is equal to the third distance.

10. The optical element driving mechanism as claimed in claim 2, wherein the fixed assembly further includes:
a casing, having a top wall having a plate-shaped structure and a side wall having a plate-shaped structure, wherein the top wall is perpendicular to the optical axis, and the side wall is parallel to the optical axis; and
a base, fixedly connected to the casing to form an accommodating space for accommodating the movable assembly;
the base includes a bottom wall and at least one connecting member, and the connecting member protrudes from the bottom wall and is perpendicular to the bottom wall;
the connecting member includes a first connecting portion and a second connecting portion;
the second connecting portion is connected between the first connecting portion and the bottom wall;
the bottom wall, the first connecting portion and the second connecting portion are integrally formed in one piece;
the casing has a through hole corresponding to the first connecting portion;
when the casing is affixed to the base, a terminal of the first connecting portion is configured to pass through the through hole;
the terminal is configured to be affixed to the casing by hot press or riveting.

11. The optical element driving mechanism as claimed in claim 10, wherein
a size of the through hole in a first direction is greater than a size of the first connecting portion in a first direction;
the first direction is perpendicular to the optical axis;
the through hole has a circular or square structure;
the first connecting portion has a cylindrical structure, a square pillar structure, or a conical structure corresponding to the through hole;
when viewed in the first direction, the terminal has a rectangular structure or a semicircular structure;
the top wall is a continuous planar structure, and when viewed in the first direction, the terminal does not overlap the top wall.

12. The optical element driving mechanism as claimed in claim 10, wherein
when viewed along the optical axis, the bottom wall has a polygonal structure;
when viewed along the optical axis, the top wall has a polygonal structure corresponding to the bottom wall;
the connecting member is located at a corner of the bottom wall;
the top wall has a flat portion and a concave portion recessed from the flat portion along the optical axis;
the concave portion is located at a corner of the top wall;
the through hole is formed on the concave portion;
when viewed in a first direction perpendicular to the optical axes, the terminal completely overlaps the flat portion.

13. The optical element driving mechanism as claimed in claim 10, wherein the fixed assembly further includes a strengthening member disposed in the second connecting portion and the bottom wall;
wherein the strengthening member includes a metal material.

14. The optical element driving mechanism as claimed in claim 10, wherein the casing has a first positioning portion, and the base has a second positioning portion corresponding to the first positioning portion;
the first positioning portion is configured to be aligned and coupled to the second positioning portion, so that the casing is affixed to the base.

* * * * *